Patented Apr. 30, 1935

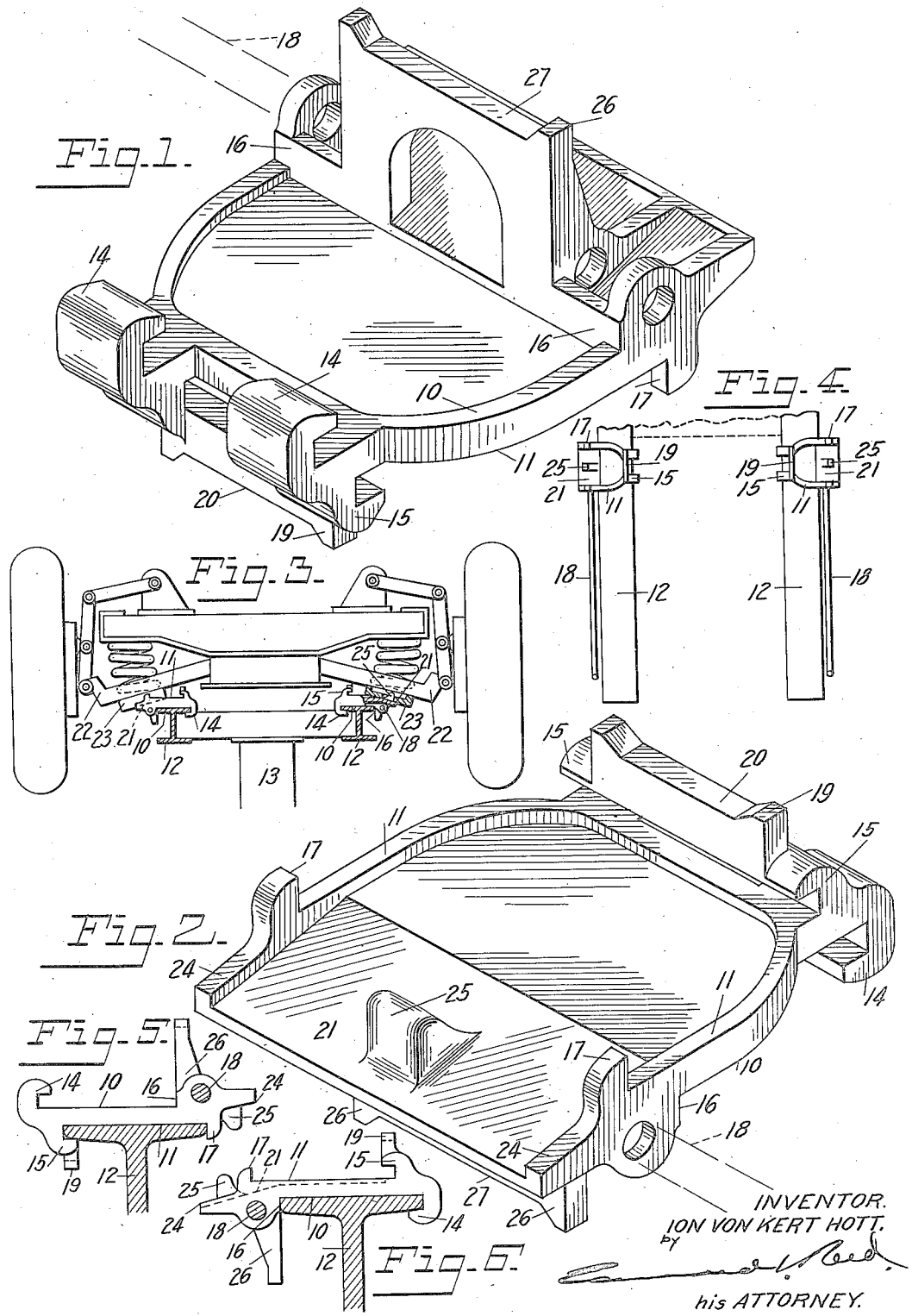

1,999,760

UNITED STATES PATENT OFFICE 1,999,760

AUTOMOBILE LIFT

Ion Von Kert Hott, Dayton, Ohio, assignor to The Joyce-Cridland Company, Dayton, Ohio, a corporation of Ohio Application May 9, 1934, Serial No. 724,735

15 Claims. (Cl. 254—89)

This invention relates to automobile lifts and more particularly to an axle supporting bracket for a lift of the free wheel type. The free wheel type of lift comprises longitudinal rails which are adapted to have supporting connection with the axles between the wheels of the automobile during the lifting operation. It is customary to provide these rails with axle supporting members or brackets which are adjustable lengthwise of the rails to properly locate the same with relation to the axles. The production of the so-called knee action type of automobile, in which the front wheels are independently movable with relation to the supporting axle, has resulted in such changes in front axle construction that the usual supporting brackets are not adapted to engage and support these new axle constructions. For example, in one type of knee action automobile the wheel is connected with an inclined lever which extends across the rail of the lift and which must be engaged and supported during the lifting operation. In another type of knee action automobile that portion of the axle structure which must be engaged by the supporting member is spaced from the ground a distance considerably greater than is customary in the old type of automobile, this distance being considerably greater than the rear axle is spaced from the ground. It is important that a lift should be adapted for all types of automobile, particularly when used in a public service station, and it is therefore essential that it should be provided with axle supporting brackets which will properly engage any type of axle structure.

One object of the present invention is to provide an axle supporting bracket having parts adapted to operatively engage a plurality of axle structures of different types; and which can be readily mounted on the rail of the lift in a position to locate the selected axle engaging part in proper relation to the axle.

A further object of the invention is to provide such an axle supporting bracket in which the axle supporting parts will be arranged on both the upper and lower sides thereof, and which can be mounted on the rail with either side uppermost.

A further object of the invention is to provide such an axle supporting bracket which will be peculiarly adapted to support the inclined lever of an axle structure such as that above mentioned.

A further object of the invention is to provide such a bracket which will be of a strong durable construction and which can be produced at a low cost.

Other objects of the invention will appear as the bracket is described in detail.

In the accompanying drawing Fig. 1 is a perspective view of an axle supporting bracket embodying my invention; Fig. 2 is a perspective view of such a bracket showing the same in reverse position; Fig. 3 is a front elevation, partly in section, showing a pair of brackets mounted on the lift and in operative engagement with one type of axle structure; Fig. 4 is a plan view of a portion of the lift showing the brackets of Fig. 3 in top plan; Fig. 5 is an elevation of the bracket showing the same mounted on the rail in one operative position; and Fig. 6 is a similar view showing the bracket mounted on the rail in another operative position.

In the drawing I have illustrated one embodiment of my invention and have shown the same as designed to accommodate axle structures of certain types but it will be understood that the invention may take various forms and may be shaped to accommodate the same to axle structures of various kinds.

In the particular construction here shown the bracket as a whole comprises an intermediate portion having flat surfaces 10 and 11 adapted to engage the tops of rails 12 forming part of the lift and here shown as carried by a ram 13. At one edge of the intermediate portion or plate the bracket is provided with hook shaped portions 14 and 15 arranged respectively above and below the corresponding flat surfaces 10 and 11, and adapted to be hooked over one edge of the rail. On that side of the bracket adjacent to the hook shaped members 14 there are provided stops or retaining parts 16 spaced from the hook shaped parts 14 a distance substantially equal to the width of the upper surface of the rail. Likewise on that side of the bracket adjacent to the hook shaped parts 15 there are provided stops or retaining parts 17 also spaced from the hook shaped parts 15 a distance substantially equal to the width of the rail. The bracket may be attached to the rail by slightly tilting the same and hooking the hook shaped parts on the then lower side of the bracket over one edge of the rail and lowering the flat intermediate portion of the bracket into engagement with the top of the rail, thus bringing the corresponding retaining parts into engagement with the opposite edge of the rail, whereby the hook shaped parts are held in firm engagement with the rail. It will be obvious that the bracket can be quickly and easily attached to the rail with either side uppermost and that it will be firmly held in position thereon without interfering with its longitudinal adjustment on the rail, which, in the present instance, is accomplished by means of handles 18 connected with the brackets.

The bracket is provided on each side thereof with one or more axle engaging parts and these parts are of such a character that they will engage and support axle structures of different kinds. In the particular construction illustrated the hook shaped part 15 is provided with a projection 19 forming an axle engaging part adapted to receive an axle of the old type and it is preferably recessed or notched, as shown at 20, to retain the axle thereon. On the same side of the bracket with the axle engaging part 19 and at the opposite edge of the bracket there is provided an inclined surface 21 adapted to engage and support the inclined lever forming a part of a certain type of axle structure. In the present construction this inclined surface is formed by sloping the lateral portion of the plate, which forms the body of the bracket, downwardly and outwardly, this sloped portion preferably having its inner edge spaced inwardly from the retaining parts 17 and extending outwardly some distance beyond those retaining parts. In the particular type of axle structure shown in Fig. 3 the lever 22 is provided with a spring socket 23 which projects below the lever and is arranged partially above the rail, and the inclined surface 21 is designed primarily to engage this spring socket. The inclined surface has at each end thereof a flange 24 and is also provided at an intermediate point with a stud 25 adapted to enter a recess or opening in the bottom of the spring socket and thus retain the latter in proper position on the bracket. When the inclined surface, or axle supporting part, is to be used the hook shaped part 14 on the opposite side of the bracket is hooked over the inner edge of the rail so that the inclined surface is arranged near the outer edge of the rail and slopes downwardly and outwardly, as shown in Fig. 3. When the axle supporting part 19 is to be used the bracket may remain in the position just described, with the part 19 adjacent the inner edge of the rail, or it may be so mounted on the rail that the part 19 will be adjacent the outer edge of the rail and the hook shaped part 14 will engage the outer edge of the rail, as shown in Fig. 6. When it is to be mounted in the last mentioned position the bracket is preferably shifted to the other rail so that the handle 18 will extend outwardly.

On its opposite side the bracket is provided with a relatively high projection or axle engaging part 26 adapted to engage a part of the axle which is relatively high with relation to the rear axle. This part is also provided with a notch or recess 27 to retain the axle thereon. In the arrangement shown the part 26 is in line with and in effect forms an extension of the retaining parts 16. When the axle engaging part 16 is to be used the hook shaped part 15 is engaged with the inner edge of the rail so that the axle engaging part will be arranged near the outer edge of the rail, as shown in Fig. 5.

It will be apparent therefore that the bracket is adapted to accommodate axles of a plurality of types and that it may be quickly and easily mounted on the rail of the lift in any one of its several positions thereon. Preferably the bracket is formed in a single piece, as by casting, and it may be produced in strong durable form at low cost. The hook shaped portions are here shown adjacent to the same lateral edge of the bracket and arranged in slightly different positions with relation to the flat portions which engage the rail, in order to properly locate the axle supporting parts with relation to the rail. It will be understood that this particular arrangement is not essential and the attaching devices may be arranged in any desired positions and may be of any suitable character. The construction and arrangement of the axle supporting parts are such that the danger of breakage is reduced to a minimum, thus providing a bracket which not only has a long life but the use of which minimizes the danger of accidents in the lifting of an automobile.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In an automobile lift comprising longitudinal rails, an axle supporting bracket having means for removably supporting the same on one of said rails with either side uppermost, and having on its respective sides supporting means for axles of different types.

2. In an automobile lift comprising longitudinal rails, an axle supporting bracket having means for removably supporting the same on one of said rails with either side uppermost, said bracket having on one side thereof means for supporting axles of a plurality of types and having on the other side thereof means for supporting an axle of another type.

3. In an automobile lift comprising longitudinal rails, an axle supporting bracket adapted to be mounted on one of said rails with either side uppermost, and having on each side thereof a hook shaped part to engage an edge of said rail, and means for retaining said hook shaped part for engagement with said rail, said bracket having on the respective sides thereof parts for supporting axles of different kinds.

4. In an automobile lift comprising longitudinal rails, an axle supporting bracket having means for supporting the same on one of said rails with either side uppermost and having on one side thereof an inclined axle supporting part, and having on the other side thereof an axle supporting projection.

5. In an automobile lift comprising longitudinal rails, an axle supporting bracket having means for supporting the same on one of said rails with either side uppermost and having on each side thereof an axle supporting projection, and also having on one side thereof an inclined axle supporting surface.

6. In an automobile lift comprising longitudinal rails, an axle supporting bracket having on one side thereof a hook shaped part to engage either edge of one of said rails, and a second part to engage that edge of said rail opposite the edge engaged by said hook shaped part, said bracket having on its other side separate parts to respectively support axles of different types.

7. In an automobile lift comprising longitudinal rails, an axle supporting bracket having on one side thereof means for attaching the same to one of said rails with either of its lateral edges outermost and having on its other side and near the respective lateral edges thereof axle supporting parts of different kinds.

8. In an automobile lift comprising longitudinal rails, an axle supporting bracket having on one side thereof means for attaching the same to one of said rails with either of its lateral edges outermost and having on its other side and near one lateral edge thereof an upstanding axle supporting part, and having near the other lateral edge of said side an inclined axle supporting part.

9. In an automobile lift comprising longitudinal rails, an axle supporting bracket having means for supporting the same in different position on one of said rails and having a plurality of axle supporting parts of different kinds so arranged that one only of said parts will be in operative position when said bracket is in any one of its positions on said rail.

10. In an automobile lift comprising longitudinal rails, an axle supporting bracket having means for supporting the same on one of said rails and also having a plurality of axle supporting parts arranged to support axles of different types.

11. In an automobile lift comprising longitudinal rails, an axle supporting bracket having means for supporting the same on one of said rails, and also having an inclined upper surface to engage an inclined portion of an axle structure, and a lug projecting upwardly from said inclined surface.

12. In an automobile lift comprising longitudinal rails, an axle supporting bracket adapted to be mounted on one of said rails with either side uppermost and having on each side thereof a part to engage said rail to control the position of said bracket thereon, one of said parts having a portion forming a support for an axle, and said bracket also having a second axle supporting part on the other side thereof.

13. In an automobile lift comprising longitudinal rails, an axle supporting bracket adapted to be mounted on one of said rails with either side uppermost and having on each side thereof a hook shaped part to engage one edge of said rail, and a part to engage the other edge of said rail and retain said hook shaped part in engagement therewith, the hook shaped part on one side of said bracket having a portion forming a support for an axle, said bracket also having an axle supporting part arranged adjacent to the retaining part on the other side thereof.

14. In an automobile lift comprising longitudinal rails, an axle supporting bracket adapted to be mounted on one of said rails with either side uppermost and having on each side thereof a hook shaped part to engage one edge of said rail, and a part to engage the other edge of said rail and retain said hook shaped part in engagement therewith, the hook shaped part on one side of said bracket having a portion forming a support for an axle, said bracket having on said side thereof an inclined axle supporting surface and having on the other side thereof an axle supporting projection arranged near that edge opposite the corresponding hook shaped part.

15. In an automobile lift comprising longitudinal rails, axial supporting brackets having means for separately mounting the same on the respective rails for adjustment lengthwise thereof, each bracket having a downwardly and outwardly inclined supporting surface adjacent to the outer edge of its rail to engage a portion of an axial structure which is inclined in the direction of the length of said axle structure.

ION VON KERT HOTT.